United States Patent [19]

Goodale

[11] 4,092,911
[45] June 6, 1978

[54] BLANCHING APPARATUS

[76] Inventor: Richard J. Goodale, P.O. Box 268, Watsonville, Calif. 95076

[21] Appl. No.: 761,977

[22] Filed: Jan. 21, 1977

[51] Int. Cl.² .......................... A23C 3/02; A23C 9/02; A23C 13/04
[52] U.S. Cl. ........................................ 99/483; 99/518
[58] Field of Search .................. 99/470–478, 99/483, 360–362, 516–518, 584; 126/348, 369

[56] References Cited

U.S. PATENT DOCUMENTS

| 2,781,070 | 2/1957 | Kilburn et al. | 99/470 |
| 3,880,068 | 4/1975 | Goodale | 99/478 |

*Primary Examiner*—Leonard D. Christian
*Attorney, Agent, or Firm*—Gerald L. Moore

[57] ABSTRACT

Blanching apparatus comprising a sealed compartment having steam manifold spaced throughout and a conveyor system therein for transporting produce such as vegetables from one end to the other for exposure to the steam. Sealed portals permit the entry and withdrawal of the produce while allowing the produce to be treated at a pressure above atmospheric with little escape of steam from the sealed chamber. Pressure relief means are provided in the wall of the container to protect the compartment seals in the event of rapid decompression sometimes resulting from the condensation of the steam.

8 Claims, 8 Drawing Figures

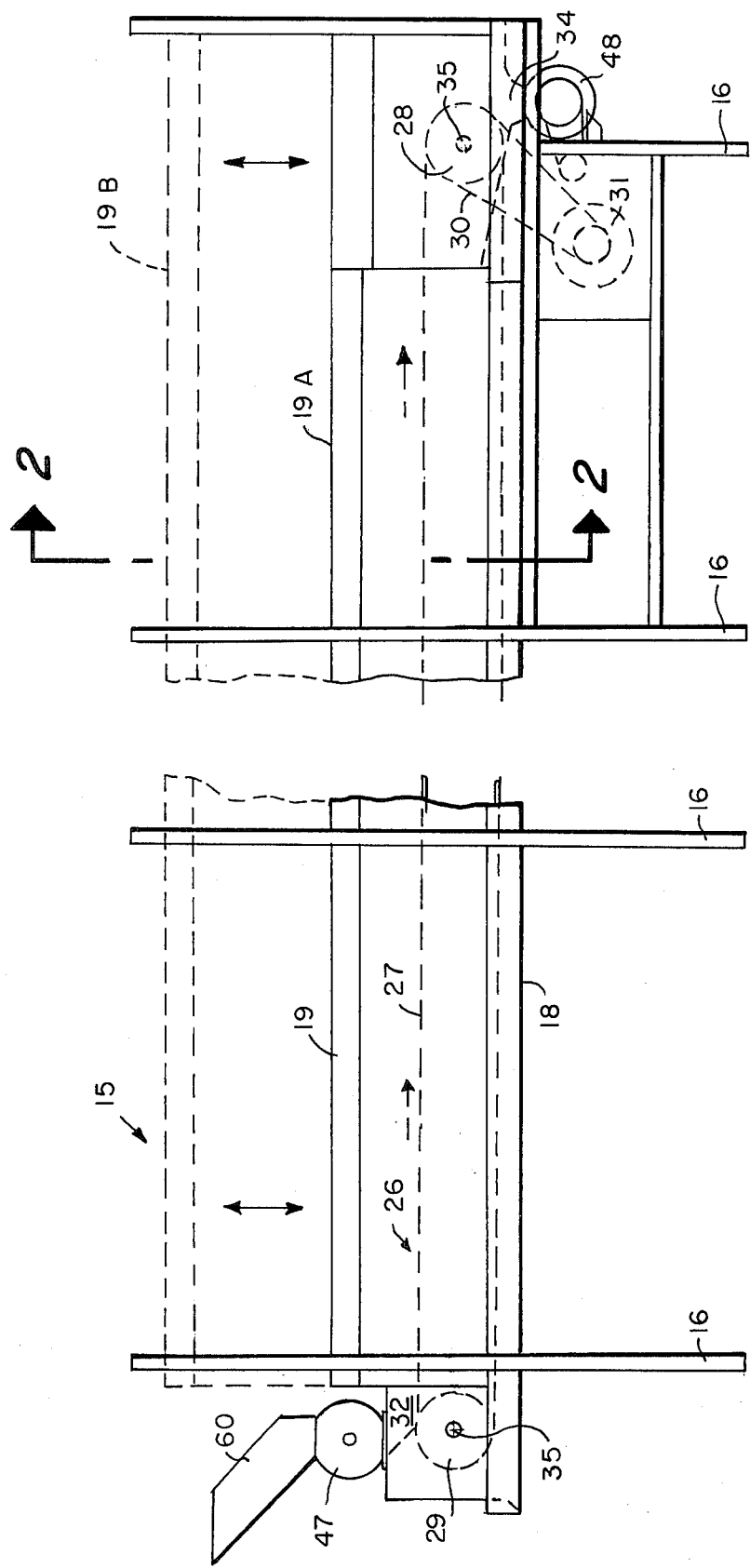

BLANCHING APPARATUS

BACKGROUND OF THE INVENTION

For washing and blanching products such as vegetables the produce must be exposed to large quantities of steam for a predetermined time period. The operating cost for blanching is primarily due to the energy expended and the conservation and efficient use of the steam and the prevention of heat loss is of major importance. In many prior devices the conveyor carrying the produce through the blanching chamber passes from the outside atmosphere into the blanching chamber at one end and possibly both ends for receiving and discharging the produce. Naturally such a conveyor serves to conduct heat outside of the chamber thereby requiring more energy to effect the blanching operation. In dry blanching, there is no exposure of the product to water either for washing or cooling. With the introduction of sufficient steam to process the product, the pressure within the blanching chamber is slightly above atomspheric. If the blanching chamber is not sufficiently sealed sufficient steam can escape to result in a significant energy loss.

In addition there sometimes occurs in such apparatus a rapid condensation of the steam resulting in an immediate cooling down of the process usually due to a rapid introduction of cold product. This steam condensation can serve to reduce the pressure in the blanching chamber below atmospheric very rapidly. In some apparatus the seals are formed by lowering the edges of the compartment or hood below the water level in a trough. Any rapid decompression of the compartment, however momentary, can serve to pull air past the sealing water and into the chamber causing undesirable splashing of water and noise in the blanching apparatus due to buckling of the walls of the chamber.

In addition the maintaining of cleanliness in such blanching apparatus is of primary importance and a continual problem. Because of the combination of the produce with the abundance of water, bacteria growth is stimulated. In addition the steam escaping into any surrounding room can cause a bacteria buildup. The present invention improves these prior devices by providing means for solving some of the problems discussed heretofore.

SUMMARY OF THE INVENTION

Apparatus for blanching products such as vegetables by exposure to steam comprising a closed chamber housing a conveyor system for transporting the products therethrough with sealed portals for introducing and discharging the product at each end of the conveyor. Pressure relief means for the chamber is provided to permit the influx of air in the event of a decompression such as occurs with a rapid condensation of the steam which can be caused by a rapid influx of product. Means are also provided for washing the conveyor during each revolution to prevent buildup of foreign matter.

DESCRIPTION OF THE DRAWINGS

FIG. 1 is a side plan view of the blanching apparatus partially cut away;

DESCRIPTION OF THE INVENTION

Figure 2:
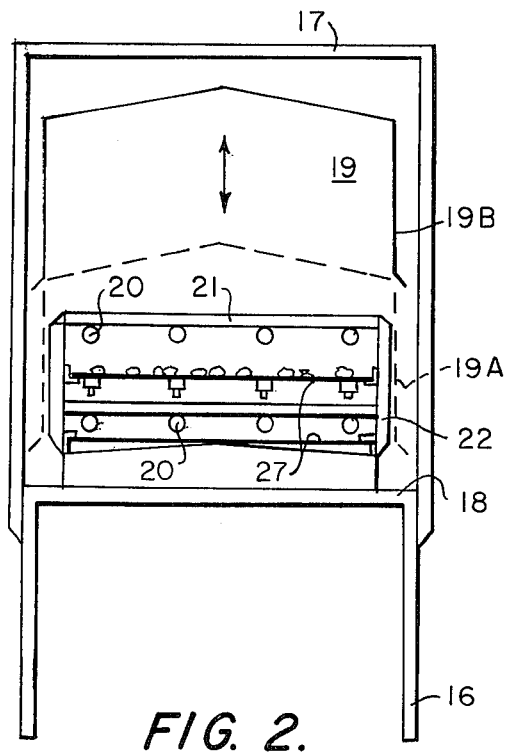
FIG. 2 is a cross-sectional view of the blanching apparatus along the line 2—2 of FIG. 1.

Shown in FIG. 1 is a blanching apparatus 15 incorporating the subject invention. The apparatus is mounted on a frame including a plurality of supporting legs 16 extending vertically and joined at the top by cross pieces 17. The frames support a bed assembly 18 which cooperates with a hood 19 to form the sealed compartment or chamber in which the blanching operation takes place. A suitable mechanism (not shown) connecting the hood with the upper frame structure allows raising of the hood vertically away from the bed for access to the interior of the blanching chamber. Thus the hood can be moved to either the dotted line position 19A (FIG. 2) or the solid line position 19B for access to the bed.

For effecting the blanching and cleaning of produce, steam is introduced into the blanching chamber and directed onto the produce from a plurality of steam manifolds or pipes 20 (FIG. 2) supported from a frame 21. The frame is mounted on a plurality of upright supports 22 extending upward from the bed 18. Thus steam flows from a source (not shown) into each of the steam manifolds and thereafter directed through openings spaced therealong onto the produce being moved through the chamber.

As pointed out before the energy consumed through the introduction of steam is a major cost in carrying out the blanching operation. The amount of steam necessary depends primarily upon the quantity of produce being processed and on the heat losses from the apparatus through conductivity of the hood and radiation. To conserve energy, the present invention allows the blanching process to be effected within the blanching chamber, totally contained within the blanching chamber and sealed from the atmosphere.

Accordingly, for transporting the produce through the blanching chamber there is mounted therein a conveyor 26 comprising an endless wire belt 27 supported between a head pulley 28 and a tail pulley 29 (FIG. 1). The head pulley 28 is power driven by a suitable means such as by a chain 30 extending from a drive motor 31 mounted beneath the bed 18. Thus as shown in FIG. 1, the head pulley 28 is driven in the clockwise direction to rotate the conveyor chain so as to transport produce placed thereon at the entrance portal 32 through the blanching chamber to an exit portal 34 at the opposite end. As explained before, the produce on the endless chain is constantly exposed to steam exiting the manifolds 20 for a predetermined time period to effect the blanching process within the enclosed chamber. The conveyor is completely enclosed within the blanching chamber and therefore does not pass to the outside atmosphere to become cooled. Thus energy is conserved by limiting the travel of the conveyor only within the blanching chamber.

Figure 7:
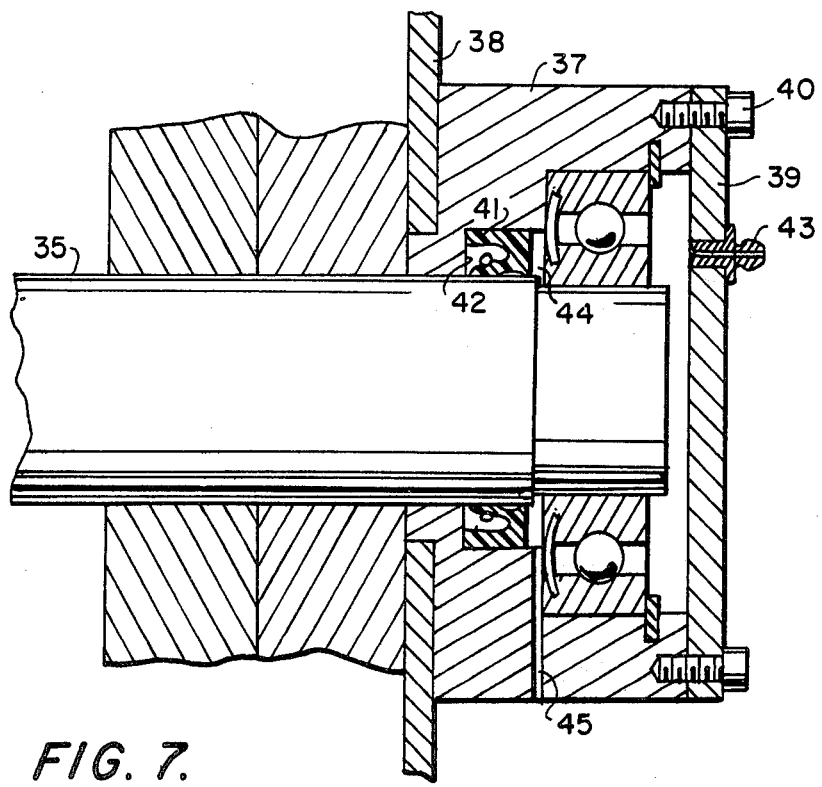
FIG. 7 is an enlarged cross-sectional view of the bearing housing for the rotating shafts.

Each of the pulleys 28 and 29 are supported on separate shafts 35 as shown in FIG. 7 and completely housed in the blanching chamber to limit any conduction of heat outside the blanching chamber except where the shaft is extended outside the chamber for drive purposes. These shafts are journaled in bearings 36 to permit rotation with the bearings being housed in a manner to limit almost totally any exposure to moisture resulting from the steam within the blanching chamber. For this purpose the bearings 36 are fixed within a support 37 fixed to a support member 38 on the bed 18. The bearings are sealed by an end plate 39 held by bolts 40 to hold the pressure within the sealed chamber at the end of the shaft 34.

To limit the access of pressured steam to the bearings by flow along the shaft 35, there is positioned within the support 37 a seal 41 within a chamber 42. This seal is axially spaced from the bearing to form a cavity 44 therebetween. Connecting with the bottom of the cavity for draining any mositure from condensed steam which might pass the seal is a drain port 45. Thus the bearings are sealed to prevent the entrance of mositure and steam from the blanching chamber while still being positioned within the blanching chamber so as not to serve as a conductor for heat to the outside atmosphere. Such pressured steam otherwise can cause corrosion of the bearing and carry away from the bearing any lubricant present in the bearing housing. A grease fitting 43 is provided for supplying lubricant to the bearing.

Figure 3:
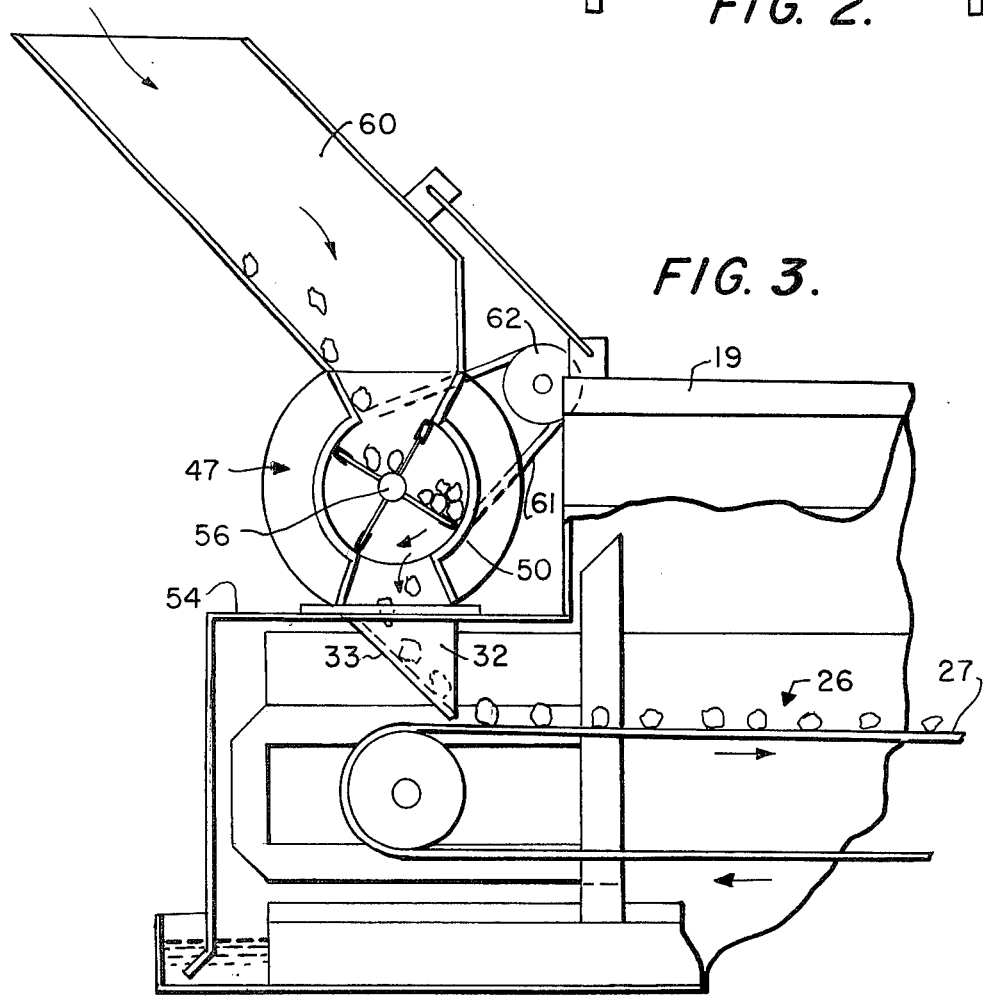
FIG. 3 is an enlarged view, partially in cross-section, of the loading end of the blanching apparatus.
Figure 6:
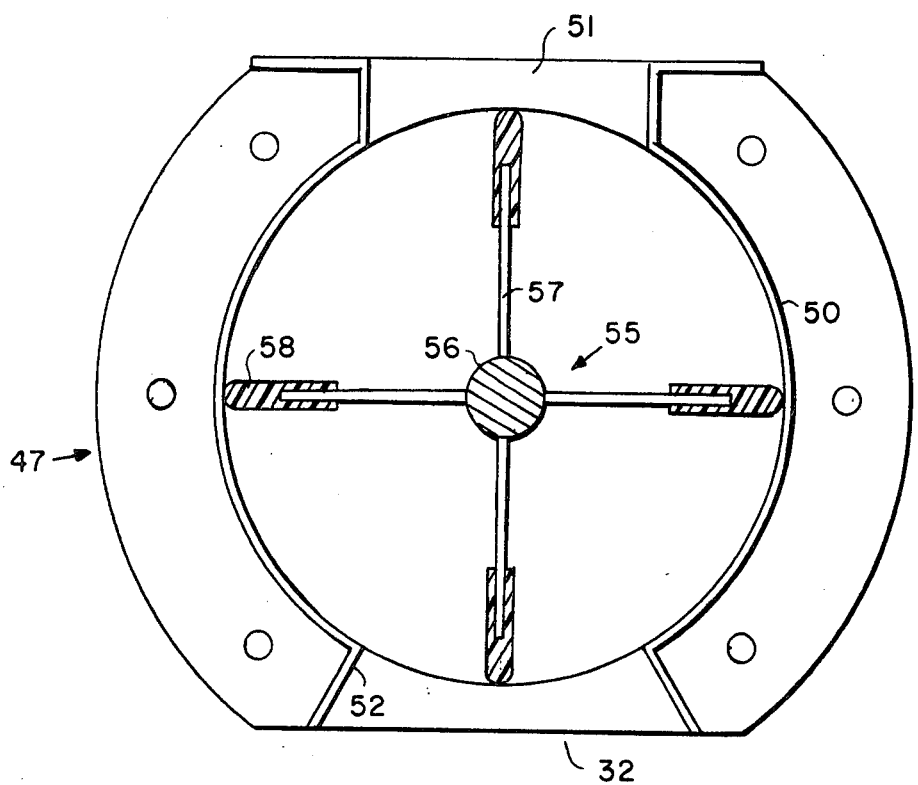
FIG. 6 is an enlarged side cross-sectional view of the rotary door mechanism for loading and discharging produce.

To seal against the loss of excess steam from within the blanching chamber, the produce is introduced and discharged through rotary valves 47 and 48 at the entrance portal 32 and exit portal 44 respectively. As shown in FIG. 6 in enlarged detail, the rotary valve 47 comprises an outer cylindrical housing having opposing walls forming a top opening 51 and a bottom opening 52 connecting with the entrance portal 32 of the blanching chamber. Shown in FIG. 3 is the hood 19 which is offset prior to the point of the entrance portal 32 so as to form a top flat wall member 54. Thus the hood serves to support the rotary valve 47. The offset hood allows a reduction in the free fall distance of the produce. Each rotary valve consists of a rotor 55 journaled for rotation about a horizontal axis on a center shaft 56 with four planar paddles or flaps 57 each forming separate quadrature compartments about the center shaft axis. Fixed to the outer end of each planar flap is a sealing member 58 which contacts the housing walls 50 so as to prevent the passage of steam therepast.

Thus to introduce produce into the blanching chamber it is passed through a chute 58 (FIG. 3) into the opening 51 to fall into a quadrature compartment of the rotor 55. As the rotor turns in the clockwise direction, each quadrature compartment revolves thereof into alignment with the entrance portal 32 of the blanching chamber to drop the produce onto a chute 60 carrying it to the conveyor 26. The rotor 55 is driven by a belt 61 powered by a motor 62 mounted on the frame above the blancher. The rotary valve 48 at the chamber discharge end operates in the same manner except the produce falls from the conveyor down through the exit portal 34 to come to rest in a quadrature compartment formed by the rotor 55 to thereafter be dropped from the blanching apparatus through the opening 53.

Figure 4:
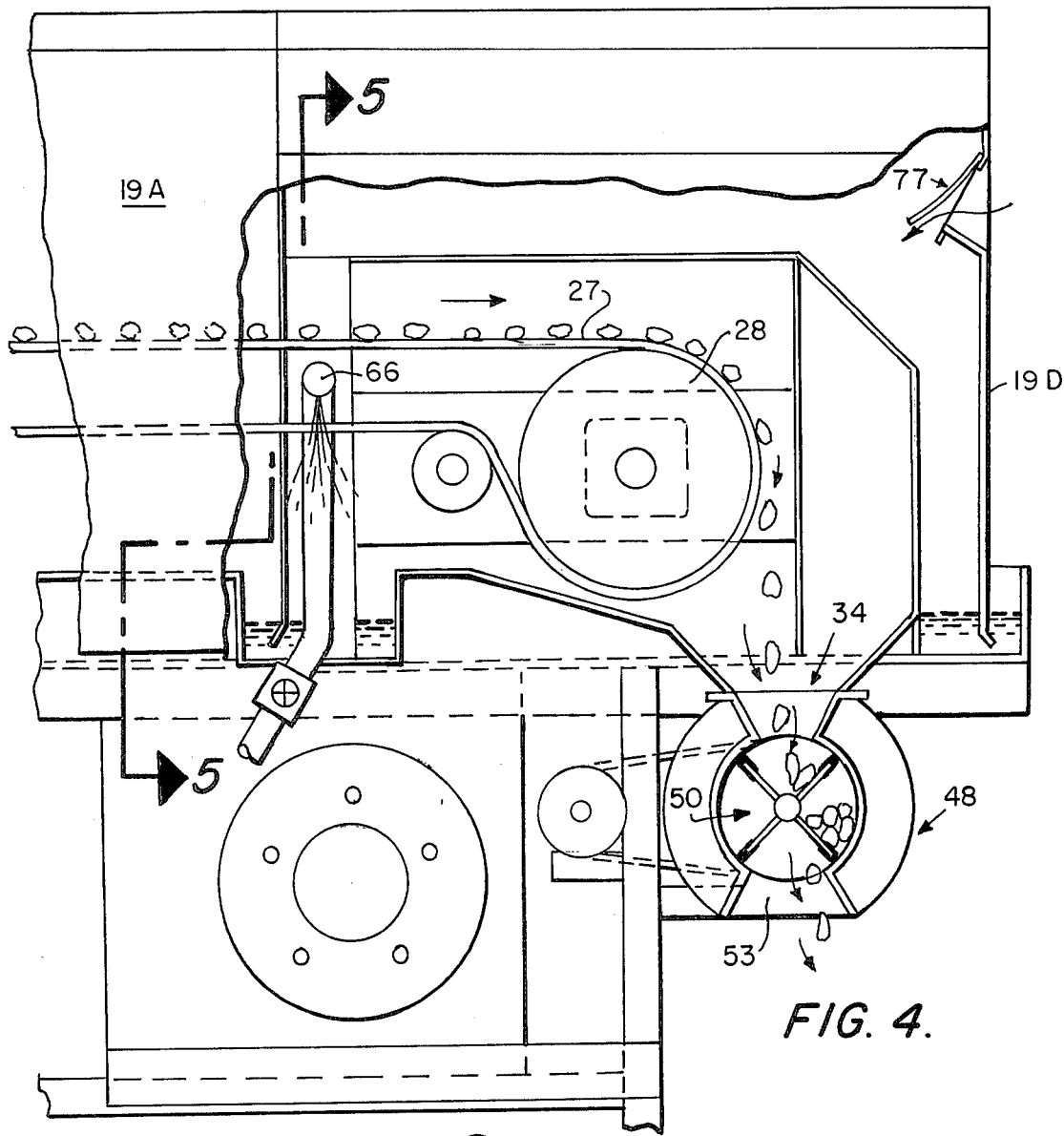
FIG. 4 is an enlarged view, partially in cross-section, of the discharge end of the blanching apparatus.
Figure 5:
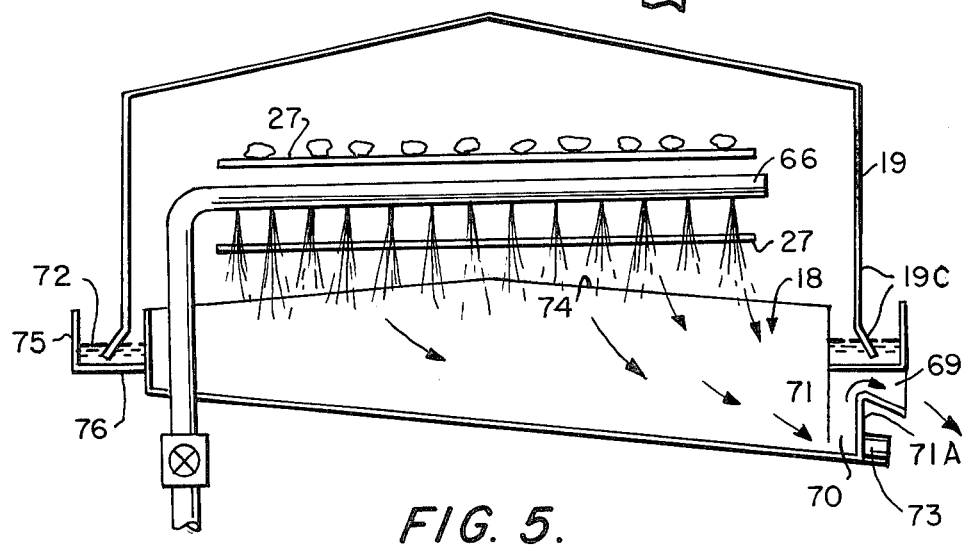
FIG. 5 is a cross-sectional view along the line 5—5 of FIG. 4.

As the produce travels along the conveyor particles will be left on the conveyor chain after the bulk thereof is emptied through the exit portal 34. In accordance with another feature of the invention there is provided means for cleaning the conveyor during each rotation as shown in FIGS. 4 and 5. For this purpose steam is forced through the conveyor chain from a manifold 66 connected to a steam supply. This manifold extends across and above the return portion of the belt 27 as it moves from the head pulley 28 so as to eject steam down through the chain into a catch tank 67. The catch tank has a bottom sloping down to an exit 69 connected through a trap 70 formed by the wall member 71. Thus the liquid level always remains above the bottom edge of the wall member 71 at the level of the top edge of the end wall 71A to prevent the passage of steam through the exit. Any foreign matter on the conveyor chain after the produce is discharged therefrom is washed from the chain and carried from the blanching chamber through the cleanout valve 73.

As pointed out before, the bed 18 and hood 19 form a sealed blanching chamber in which the produce is exposed to a steam atmosphere. For sealing around the hood bottom edge the bed 18 includes a continuous circumferential trough 72 which catches the water from the condensed steam falling on the bed top surface 74. This top surface is crowned so as to cause the water to flow to the edges and drop into the trough. The trough is formed by a side wall 75 and a bottom wall 76 fixed to the outer edge of the bed in alignment with the bottom edge 19C of the hood. Thus as the hood is lowered to the position 19A (FIG. 2) the bottom edge 19C is moved to a position below the water level in the trough to seal against the passage of steam from within the blanching chamber to the outside.

However past use of blanching systems of this general type has resulted periodically in the rapid condensation of the steam because of the initiation of a cooling of the blanching apparatus. The process is accumulative in that a slight cooling of the blanching apparatus will cause condensation of a portion of the steam which in turn results in a water runoff and a resulting further cooling of the apparatus. If the process of condensation proceeds sufficiently, a rapid condensation of all of the steam in the blanching apparatus will follow. Any such total condensation causes a rapid lowering of the pressure within the blanching chamber causing a substantial differential presssure between the chamber and the surrounding atmosphere. This differential pressure can result in the water within the trough 72 being pushed or sucked into the blanching chamber thereby destroying the sealing effect around the bottom of the hood 19. It such occurs a significant amount of time is necessary to once again condition the blanching apparatus for further operation.

Figure 8:
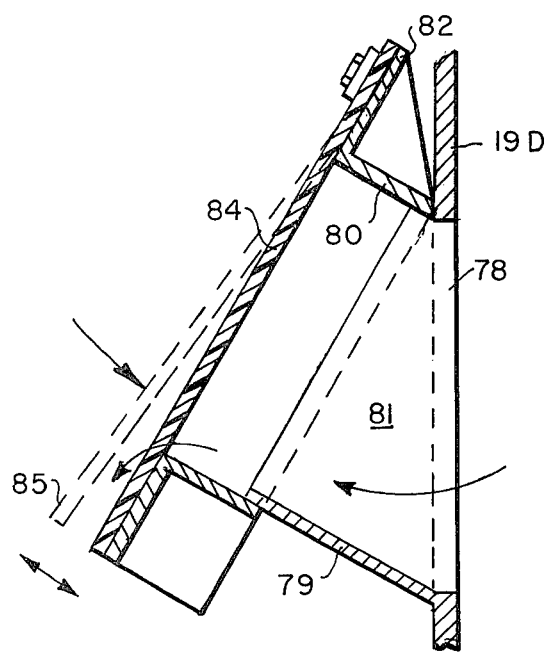
FIG. 8 is an enlarged cross-sectional view of the pressure relief valve for the hood.

In accordance with another feature of the invention, there is provided a pressure relief means in the hood operable only when the pressure within the hood drops below a predetermined valve to vent the chamber and prevent the water in the sealing trough from being dissipated. Thus recovery of the blanching operation can be effected much more quickly with very little interruption in the process. Accordingly as shown primarily in FIGS. 4 and 8 there is provided a pressure relief valve 77 in the end wall 19D of the hood comprising a port 78 in the end wall surrounded by a bottom wall 79, a top wall 80 and side walls 81 connecting the bottom and top walls as they extend into the blanching chamber. Fixed to the extending edges of these walls is a flange 82. The walls around the opening have the outer ends thereof terminal at an angle to vertical. At the portion of the flange 82 adjoining the top wall 80 there is bolted a flexible valve member or cover 84 which overlaps the flange around all of the edges of the opening 78 between the side walls. Means are provided to normally bias this valve member closed which in the embodiment shown is gravity pressing the cover flat against the flange 82. However with a rapid decompression within the blanching chamber, the surrounding atmospheric pressure will lift the flap 84 to the dotted line position 85 and allow air to pass into the blanching chamber as illustrated by the arrows. Thus the reduced pressure within the blanching chamber is relieved immediately to prevent the sealing trough water from being pulled into the blanching chamber which otherwise would have to be replaced before the blanching operation could be reinitiated.

The invention claimed is:

1. Apparatus for blanching products such as vegetables by exposing the vegetables to steam from a steam source, said apparatus comprising in combination:
   a container forming a blanching chamber;
   a conveyor system for transporting vegetables from one end of said chamber to the other, said conveyor system comprising a conveyor belt fixed between two spaced drive rollers positioned at opposite ends of the chamber;
   first valve means for introducing vegetable into one end of the chamber for deposit onto the receiving end of said conveyor belt;
   second valve means for receiving vegetables from the conveyor belt at the other end of said chamber and for transporting said vegetables from said chamber;
   said valve means for introducing and receiving vegetables including sealing means for preventing the escape of gas from said chamber and allowing a buildup of pressure within the chamber;
   a steam conducting manifold connecting with the steam source for the transport of steam to spaced points along said conveyor carrying the vegetables for exposing the vegetables to steam during their travel through the chamber; and
   pressure relief means for permitting air to enter the chamber with the occurrence of a below atmospheric pressure condition within the chamber caused by the sudden condensing of steam therein while preventing the passage of air from the chamber.

2. Apparatus for blanching products such as vegetables by exposing the vegetables to steam from a steam source, said apparatus comprising in combination:
   a container forming a blanching chamber;
   a conveyor system for transporting vegetables from one end of said chamber to the other, said conveyor system comprising a conveyor belt fixed between two spaced drive rollers positioned at opposite ends of the chamber;
   first valve means for introducing vegetables into one end of the chamber for deposit onto the receiving end of said conveyor belt;
   second valve means for receiving vegetables from the conveyor belt at the other end of said chamber and for transporting said vegetables from said chamber;
   said means for introducing and receiving vegetables including sealing means for preventing the escape of gas from said chamber and allowing a buildup of pressure within the chamber;
   a steam conducting manifold connecting with the steam source for the transport of steam to spaced points along said conveyor carrying the vegetables for exposing the vegetables to steam during their travel through the chamber;
   pressure relief means for permitting air to enter the chamber with the occurence of a below atmospheric pressure condition within the chamber caused by the sudden condensing of steam therein;
   said pressure relief means comprising an opening in said chamber wall with a planar member attached at one edge above said opening and positioned to cover said opening; and
   means to normally bias said planar member against the chamber wall, said bias means being yieldable to a predetermined differential pressure between the chamber and the surrounding air.

3. Apparatus as defined in claim 1 including means for spraying a mixture of steam and water on said conveyor after said vegetables are extracted therefrom to clean said conveyor.

4. Apparatus as defined in claim 3 wherein said means for spraying steam and water includes a sump positioned in the bottom wall of said chamber to catch and carry away from said chamber any particles washed from the belt.

5. Apparatus as defined in claim 4 including a trap connecting said sump to the exterior of said container for carrying away water and particles while preventing the passage of steam to maintain the pressure within the chamber.

6. Apparatus for blanching products such as vegetables by exposing the vegetables to steam from a steam source, said apparatus comprising in combination:
   a container forming a blanching chamber by the combination of a hood having vertical side walls and a bed having means forming a water container immersing the bottom edges of the hood side walls to seal against steam escaping from said chamber;
   a conveyor system for transporting vegetables from one end of said chamber to the other, said conveyor system comprising a conveyor belt fixed between two spaced drive rollers positioned at opposite ends of the chamber;
   first valve means for introducing vegetables into one end of the chamber for deposit onto the receiving end of said conveyor belt;
   second valve means for receiving vegetables from the conveyor belt at the other end of said chamber and for transporting said vegetables from said chamber;
   said means for introducing and receiving vegetables including sealing means for preventing the escape of gas from said chamber and allowing a buildup of pressure within the chamber;
   a steam conducting manifold connecting with the steam source for the transport of steam to spaced points along said conveyor carrying the vegetables for exposing the vegetables to steam during their travel through the chamber; and
   pressure relief means for permitting air to enter the chamber with the occurrence of a below atmospheric pressure condition with the chamber caused by the sudden condensing of steam therein.

7. Apparatus as defined in claim 6 including means for moving said hood vertically away from the bed.

8. Apparatus as defined in claim 1 wherein said valve means includes a rotary valve comprising a housing having opposing walls forming a top and bottom opening and a rotor positioned therebetween having wall members extending radially outward therefrom, said rotor wall members being positioned to contact opposing walls of said housing simultaneously as it rotates thereby to seal between the exterior and interior of the chamber while allowing vegetables to be carried therethrough.

* * * * *